US009549168B2

(12) United States Patent
Knighton et al.

(10) Patent No.: US 9,549,168 B2
(45) Date of Patent: Jan. 17, 2017

(54) HAND HELD PORTABLE THREE DIMENSIONAL SCANNER

(71) Applicants: Mark S. Knighton, Santa Monica, CA (US); Peter J. DeLaurentis, Los Angeles, CA (US); William D. McKinley, Manhattan Beach, CA (US); David S. Agabra, Pacific Palisades, CA (US)

(72) Inventors: Mark S. Knighton, Santa Monica, CA (US); Peter J. DeLaurentis, Los Angeles, CA (US); William D. McKinley, Manhattan Beach, CA (US); David S. Agabra, Pacific Palisades, CA (US)

(73) Assignee: NextPat Limited, Sheung Wan (HK)

( * ) Notice: Subject to any disclaimer, the term of this patent is extended or adjusted under 35 U.S.C. 154(b) by 139 days.

(21) Appl. No.: 14/252,125

(22) Filed: Apr. 14, 2014

(65) Prior Publication Data

US 2014/0218480 A1  Aug. 7, 2014

Related U.S. Application Data

(62) Division of application No. 13/361,693, filed on Jan. 30, 2012, now Pat. No. 8,699,829, which is a division
(Continued)

(51) Int. Cl.
*G06K 9/20* (2006.01)
*H04N 13/02* (2006.01)
*G01B 11/24* (2006.01)
*G06K 9/32* (2006.01)

(52) U.S. Cl.
CPC .......... *H04N 13/0203* (2013.01); *G01B 11/24* (2013.01); *G06K 9/32* (2013.01); *H04N 13/0271* (2013.01)

(58) Field of Classification Search
CPC ...... A61B 6/022; G06K 2209/40; G06K 9/20; G06K 9/22; G06K 9/222; G06K 9/224
See application file for complete search history.

(56) References Cited

U.S. PATENT DOCUMENTS 3,636,250 A   1/1972  Haeff
3,913,582 A   10/1975 Sharon
(Continued)

FOREIGN PATENT DOCUMENTS

DE   4134546 A1   4/1993
DE   4313860 A1   11/1994
(Continued)

OTHER PUBLICATIONS

Office Action in European Patent Application No. 05737661.8 dated Aug. 22, 2014. 4 pages.
(Continued)

*Primary Examiner* — Duy M Dang
(74) *Attorney, Agent, or Firm* — Thomas Coester Intellectual Property

(57) ABSTRACT

Embodiments of the invention may include a scanning device to scan three dimensional objects. The scanning device may generate a three dimensional model. The scanning device may also generate a texture map for the three dimensional model. Techniques utilized to generate the model or texture map may include tracking scanner position, generating depth maps of the object and generation composite image of the surface of the object.

15 Claims, 12 Drawing Sheets

Related U.S. Application Data of application No. 12/773,428, filed on May 4, 2010, now Pat. No. 8,116,559, which is a division of application No. 10/830,210, filed on Apr. 21, 2004, now Pat. No. 7,711,179.

(56) References Cited

U.S. PATENT DOCUMENTS

| | | |
|---|---|---|
| 4,089,608 A | 5/1978 | Hoadley |
| 4,165,530 A | 8/1979 | Sowden |
| 4,302,097 A | 11/1981 | Chlestil |
| 4,404,594 A | 9/1983 | Hannan |
| 4,532,605 A | 7/1985 | Waller |
| 4,564,295 A | 1/1986 | Halioua |
| 4,590,608 A | 5/1986 | Chen et al. |
| 4,622,462 A | 11/1986 | Eaton et al. |
| 4,627,734 A | 12/1986 | Rioux |
| 4,637,773 A | 1/1987 | Nakashima et al. |
| 4,641,972 A | 2/1987 | Halioua et al. |
| 4,657,394 A | 4/1987 | Halioua |
| 4,693,663 A | 9/1987 | Brenholt et al. |
| 4,705,401 A | 11/1987 | Addleman et al. |
| 4,724,525 A | 2/1988 | Purcell et al. |
| 4,737,032 A | 4/1988 | Addleman et al. |
| 4,802,759 A | 2/1989 | Matsumoto et al. |
| 4,846,577 A | 7/1989 | Grindon |
| 5,016,153 A | 5/1991 | Gismondi et al. |
| 5,056,914 A | 10/1991 | Kollodge |
| 5,067,817 A | 11/1991 | Glenn |
| 5,101,442 A | 3/1992 | Amir |
| 5,125,043 A | 6/1992 | Karlsson |
| 5,131,844 A | 7/1992 | Marinaccio et al. |
| 5,132,839 A | 7/1992 | Travis |
| 5,135,309 A | 8/1992 | Kuchel et al. |
| 5,140,129 A | 8/1992 | Torii et al. |
| 5,153,728 A | 10/1992 | Nakayama et al. |
| 5,175,601 A | 12/1992 | Fitts |
| 5,184,733 A | 2/1993 | Arnarson et al. |
| D334,439 S | 3/1993 | Meyer et al. |
| 5,216,817 A | 6/1993 | Misevich et al. |
| 5,218,427 A | 6/1993 | Koch |
| D337,059 S | 7/1993 | Crafoord |
| D337,060 S | 7/1993 | Crafoord |
| 5,231,470 A | 7/1993 | Koch |
| 5,237,404 A | 8/1993 | Tanaka et al. |
| 5,247,555 A | 9/1993 | Moore et al. |
| 5,282,045 A | 1/1994 | Mimura et al. |
| 5,285,397 A | 2/1994 | Heier et al. |
| 5,289,264 A | 2/1994 | Steinbichler |
| D345,028 S | 3/1994 | Alvarez Baranga |
| 5,303,136 A | 4/1994 | Brown |
| 5,307,292 A | 4/1994 | Brown et al. |
| 5,315,512 A | 5/1994 | Roth |
| 5,335,317 A | 8/1994 | Yamashita et al. |
| 5,337,149 A | 8/1994 | Kozah et al. |
| 5,377,011 A | 12/1994 | Koch |
| 5,414,647 A | 5/1995 | Ebenstein et al. |
| 5,416,609 A | 5/1995 | Matsuda et al. |
| 5,432,622 A | 7/1995 | Johnston et al. |
| 5,453,784 A | 9/1995 | Krishnan et al. |
| 5,471,303 A | 11/1995 | Ai et al. |
| 5,531,520 A | 7/1996 | Grimson et al. |
| 5,559,334 A | 9/1996 | Gupta et al. |
| 5,585,926 A | 12/1996 | Fujii et al. |
| 5,592,563 A | 1/1997 | Zahavi |
| D377,932 S | 2/1997 | Schena et al. |
| 5,611,147 A | 3/1997 | Raab |
| 5,614,981 A | 3/1997 | Bryant et al. |
| 5,617,645 A | 4/1997 | Wick et al. |
| 5,621,529 A | 4/1997 | Gordon et al. |
| 5,627,771 A | 5/1997 | Makino |
| 5,636,025 A | 6/1997 | Bieman et al. |
| 5,646,733 A | 7/1997 | Bieman |
| 5,659,804 A | 8/1997 | Keller |
| 5,661,667 A | 8/1997 | Rueb et al. |
| 5,669,150 A | 9/1997 | Guertin et al. |
| 5,678,546 A | 10/1997 | Truppe |
| 5,689,446 A | 11/1997 | Sundman et al. |
| 5,701,173 A | 12/1997 | Rioux |
| 5,704,897 A | 1/1998 | Truppe |
| 5,708,498 A | 1/1998 | Rioux et al. |
| 5,724,264 A | 3/1998 | Rosenberg et al. |
| 5,745,175 A | 4/1998 | Anderson |
| 5,747,822 A | 5/1998 | Sinclair et al. |
| 5,748,194 A | 5/1998 | Chen |
| 5,771,310 A | 6/1998 | Vannah |
| 5,794,356 A | 8/1998 | Raab |
| 5,805,289 A | 9/1998 | Corby, Jr. et al. |
| 5,847,832 A | 12/1998 | Liskow et al. |
| 5,864,640 A | 1/1999 | Miramonti et al. |
| 5,870,220 A | 2/1999 | Migdal et al. |
| 5,880,846 A | 3/1999 | Hasman et al. |
| 5,894,529 A | 4/1999 | Ting |
| 5,898,508 A | 4/1999 | Bekanich |
| 5,907,359 A | 5/1999 | Watanabe |
| 5,907,640 A | 5/1999 | Delean |
| 5,910,845 A | 6/1999 | Brown |
| 5,926,782 A | 7/1999 | Raab |
| 5,944,598 A | 8/1999 | Tong et al. |
| 5,946,645 A | 8/1999 | Rioux et al. |
| D414,676 S | 10/1999 | Cieslikowski et al. |
| 5,978,748 A | 11/1999 | Raab |
| 5,988,862 A | 11/1999 | Kacyra et al. |
| 5,995,650 A | 11/1999 | Migdal et al. |
| 5,999,641 A | 12/1999 | Miller et al. |
| 6,016,487 A | 1/2000 | Rioux et al. |
| 6,028,672 A | 2/2000 | Geng |
| 6,037,584 A | 3/2000 | Johnson et al. |
| 6,040,910 A | 3/2000 | Wu et al. |
| D423,534 S | 4/2000 | Raab et al. |
| 6,057,909 A | 5/2000 | Yahav et al. |
| 6,078,701 A | 6/2000 | Hsu et al. |
| 6,091,905 A | 7/2000 | Yahav et al. |
| 6,100,517 A | 8/2000 | Yahav et al. |
| 6,111,582 A | 8/2000 | Jenkins |
| 6,128,086 A | 10/2000 | Fowler et al. |
| 6,137,896 A | 10/2000 | Chang et al. |
| 6,157,747 A | 12/2000 | Szeliski et al. |
| 6,192,393 B1 | 2/2001 | Tarantino et al. |
| 6,233,014 B1 | 5/2001 | Ochi et al. |
| 6,249,616 B1 | 6/2001 | Hashimoto |
| 6,298,569 B1 | 10/2001 | Raab et al. |
| 6,366,357 B1 | 4/2002 | Svetkoff et al. |
| 6,366,831 B1 | 4/2002 | Raab |
| 6,535,250 B1 | 3/2003 | Okisu et al. |
| 6,535,794 B1 | 3/2003 | Raab |
| D472,824 S | 4/2003 | Raab et al. |
| 6,549,288 B1 | 4/2003 | Migdal et al. |
| 6,567,156 B1 | 5/2003 | Kerner |
| 6,592,241 B1 | 7/2003 | Kovacik et al. |
| D478,392 S | 8/2003 | Kovacik |
| 6,606,539 B2 | 8/2003 | Raab |
| 6,639,684 B1 | 10/2003 | Knighton et al. |
| 6,701,006 B2 | 3/2004 | Moore et al. |
| 6,775,403 B1 | 8/2004 | Ban et al. |
| 6,885,479 B1 | 4/2005 | Pilu |
| 7,019,278 B2 | 3/2006 | Douglas |
| 2002/0060669 A1 | 5/2002 | Sze |
| 2002/0163573 A1 | 11/2002 | Bieman et al. |
| 2003/0063775 A1 | 4/2003 | Rafii et al. |
| 2003/0160970 A1 | 8/2003 | Basu et al. |
| 2003/0164952 A1 | 9/2003 | Deichmann et al. |
| 2003/0231793 A1 | 12/2003 | Crampton |
| 2004/0125205 A1 | 7/2004 | Geng |
| 2005/0006477 A1 | 1/2005 | Patel |
| 2005/0103852 A1 | 5/2005 | Lucera et al. |
| 2005/0237581 A1 | 10/2005 | Knighton et al. |
| 2006/0072121 A1 | 4/2006 | Knighton et al. |

FOREIGN PATENT DOCUMENTS

| | | |
|---|---|---|
| WO | WO9958930 | 11/1999 |
| WO | WO 01/09836 A1 | 2/2001 |
| WO | WO-0169172 | 9/2001 |

OTHER PUBLICATIONS www.pointcloud.com/pages/Home.html, "Point Cloud" accessed Dec. 16, 1999, 5 pgs.

deskeng.com/3dd.htm, "Desktop Engineering, The Complete Computing Resource for Engineers", 1977 Helmers Publishing, Inc., 1 pg.

www.geometrixinc.com/mainwin.html, "Who says you can't build Rome in a Day?" accessed Dec. 16, 1999, 4 pgs.

www.inharmonytech.com/venus3d.index.html, "Introducing Venus 3D" accessed Dec. 16, 1999, 4 pgs.

Internet World, Four Phographic VR Technologies, Dec. 7, 1998, vol. 4, No. 40, (Dec. 7, 1998), p. 37.

World Wide Web, ImageZoom 1.0 (Applet), Internet, Jun. 11, 1999, URL: http://www.digitalcats.com/US/search/rid00004281.html, (Jun. 11, 1999).

Be Here Corporation, 360 Video, Internet, Nov. 10, 2000, http://www.behere.com/process.htm.

Remote Reality, Company Overview/Products and Services, Internet accessed Dec. 16, 1999.

QTVR Resources, Resources, Internet, Nov. 10, 2000, http://www.vet.cornell.edu/webweeks/tutorials,quicktime/qtvrresources.htm.

DMOZ, Open Directory Project, Internet, Nov. 10, 2000, http://dmoz.org/Arts/Photography/Panoramic/Cameras_and_Software/.

Kaidan Incorporated, New Product Announcements, Nov. 10, 2000, wysiwyg://100/http://www.kaidan.com/alliances.html.

PCT International Search Report (dated Oct. 24, 2007), International Application No. PCT/US05/13640—International filing Date Apr. 20, 2005, (Oct. 24, 2007), 10 pages.

"Desktop Three-Dimensional Scanner", U.S. Appl. No. 11/336,281—Date filed: Jan. 20, 2006, First Named Inventor: Mark S. Knighton, 27 pages.

"Multiple Laser Scanner", U.S. Appl. No. 11/336,216, Date filed: Jan. 20, 2006, First Named Inventor—Mark S. Knighton, 33 pages.

"Preliminary NextEngine 3D Communicator", User's Guide, NextEngine, Inc., Release Date: Jul. 2004, (Jul. 2004), 49 pages.

Blanz, et al., "What object attirbutes determine canonical views?", Preception, vol. 28(5), Dec. 23, 2008, pp. 1-62., (Dec. 23, 2008).

Carrihill, Brian, et al., "Experiments with the Intensity Ratio Depth Sensor", Computer Vision, Graphics and Image Processing 32, 1985, New York, New York, USA, (1985), 337-358.

Clark, J, et al., "Improving Laser Triangulation Sensors Using Polarization", Computer Vision 1995, Proceedings., Fifth International Conference on, vol., no., Jun. 20-23, 1995, pp. 981-986.

Nextengine, Inc., European Search Report mailed Dec. 19, 2011; EP Appln No. 05737661.8, (Dec. 19, 2011).

HAND HELD PORTABLE THREE DIMENSIONAL SCANNER

This patent application is a divisional of application Ser. No. 13/361,693, filed on Jan. 30, 2012, which is a divisional of application Ser. No. 12/773,428, filed on May 4, 2010 issued as U.S. Pat. No. 8,116,559 on Feb. 14, 2012, which is a divisional of application Ser. No. 10/830,210, filed on Apr. 21, 2004, entitled, HAND HELD PORTABLE THREE DIMENSIONAL SCANNER, issued as U.S. Pat. No. 7,711,179 on May 4, 2010.

BACKGROUND

Field of the Invention

The embodiments of the invention relate to scanning. Specifically, the embodiments relate to scanning three dimensional objects to generate a three dimensional representation of the objects.

Background

Scanning technology utilizes an image sensor to collect light reflected from an object to generate an image of the object. A mirror and lens system is combined with the imaging device to focus the light reflected by the object onto the image sensor. Image sensors convert light energy into an electrical charge and then to a set of bits representing the color and intensity of the light.

The image sensor may be one of a charge coupled device (CCD) and a complementary metal oxide semiconductor (CMOS). These individual devices are typically arranged into an area array. The number of sensors, each representing a pixel (short for 'picture element'), determine the resolution of the image taken. A pixel is the smallest unit that makes up a digital image. A pixel can represent the shade and color of a portion of an image. The output of a set of image sensors is encoded as a set of pixels to create a digital image.

The digital image may be stored in a compressed format such as in a jpeg, tiff, or gif format. The image is then stored in a digital storage device and may be displayed on a monitor by a display application. The digital image is a two dimensional image.

Scanning devices are used in flatbed scanners and copying machines. These devices are large and capable of only scanning relatively flat objects such as paper to create two dimensional images of the object.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
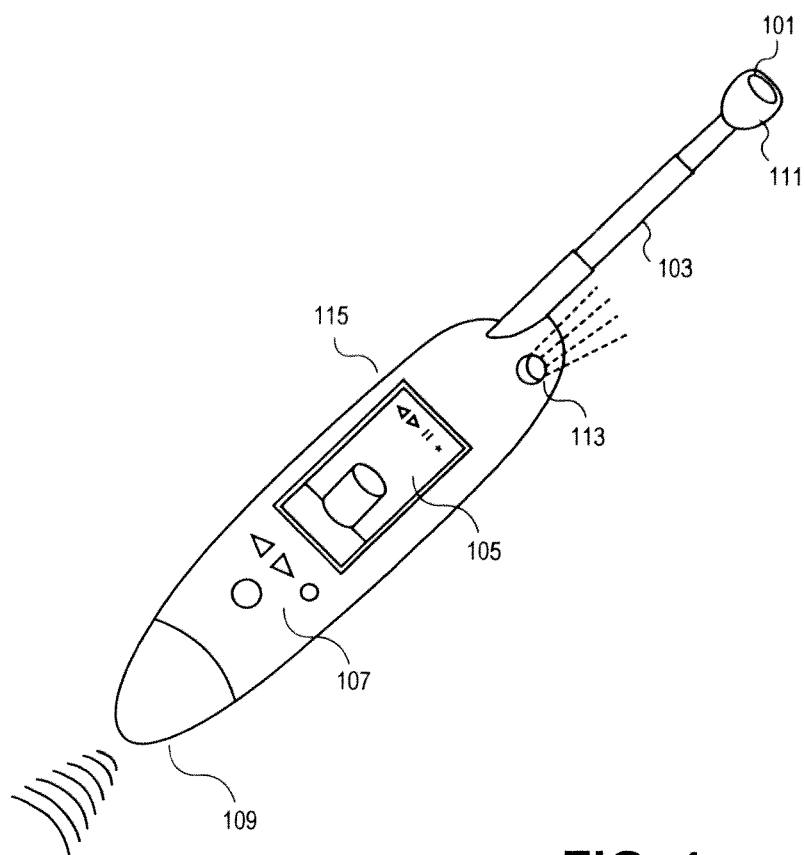
FIG. 1 is a diagram of one embodiment of a scanning device.

FIG. 1 is one embodiment of a hand held portable scanning device. The scanning device may be used to generate three dimensional representation of any type of object. As used herein three dimensional representations may be any type of digital modeling, abstraction or similar techniques that may utilize depth maps, polygon meshes, parametric solids, point clouds and similar data structures to create and store three dimensional representation of the scanned object. In one embodiment, the scanner may include a lens 101 or set of lenses. Lens 101 may focus light on one or more image sensing arrays (ISA). In one embodiment, the ISAs may be a charged coupled device (CCD), complementary metal oxide semiconductor (CMOS) sensor, or similar imaging array. Lens 101 may include multiple lenses or focal points to focus light on an imaging device or set of imaging devices. Lens 101 may be moveable to alter the focal point or focus of incoming light. In another embodiment, lens 101 may be replaced by or supplemented by a reflector, light guide or similar article, any of which may be referred to as an "optical element." By varying the focal settings different aspects of the relief of an object may be brought into focus on an ISA. In one embodiment, an optical system having one or more optical elements distributes a same view of a target to a plurality of ISA's, each having a different focal range relative to the target.

In one embodiment, the scanning device may be a "hand held" device. As used herein, a hand held device may be any device of a small size and weight suitable to be held and used by a human hand. Movement and positioning may be affected by the user without mechanical assistance. This is to be distinguished from a "hand directed" device in which a capture end is tethered by an arm to a fixed location but movable relative to that location by application of manual force.

In one embodiment, lens 101 may fill an aperture of housing 111. Housing 111 may also contain one or more ISAs and actuators for adjusting the focus of lens 101. Housing 111 may be external to a main housing 115. Housing 111 may be attached to main housing 115 by a telescoping attachment 103. In another embodiment, lens housing 111 may be attached to main housing 115 by a bendable or stretchable material or similar structure to allow lens housing 111 to access areas through small apertures and similar obstructions. Telescoping attachment 103 or similar structure may be attached to a set of actuators, sensors or similar structures to allow the manipulation of lens 101 positioning from controls 107 at main housing 115, a remote controller or similar system. Lens housing 111 positioning may be automated by software local to the scanner or external to the scanner. In one embodiment, lens housing 111 or the scanning device may contain a stabilizer mechanism to maintain an orientation of lens 101 or the ISA by compensating for movement of the scanning device during the capture of an image.

In one embodiment, small motors, servos, or piezo actuators may be used to move the relative position of the lens, the ISA and other optical elements. For example, this may be accomplished by moving the ISA, the lens, or both. This variance of relative positioning causes a change in the focus of the ISA and constitutes one example of changing the focal settings of the capture device. In one embodiment, lens housing 111 may contain a reflector between lens 101 and the ISA to alter the focal depth from the target object to be scanned to the ISA. In another embodiment, an ISA may be fabricated to allow it to capture different focused images at a plurality of depths within the structure of the ISA. In one embodiment, the focus at different depths within the ISA permits two or more images having different depths of focus to be captured concurrently. Such an ISA may be thought of as having multiple image planes. In one embodiment, each image plane can be read from the ISA individually and independently of the other image plane(s).

In one embodiment, housing 111 may have a maximum cross dimension (e.g., diameter) of less than two inches to allow access to small spaces and through small apertures. This flexibility permits capture of a wide array of possible targets. "Target" as used herein generally refers to a physical object, portion of an object and/or a collection of objects or portions thereof.

In one embodiment, main housing 115 may include a visual display 105 to show the current input from the imaging device. In another embodiment, visual display 105 may provide a progress report showing a wide view of all or a portion of a target in one representation and showing a successfully captured portion of the wide view as a different representation. This form of running progress report permits a user to visualize the data collected in the context of the larger target. Moreover, because the display is local to the scanner, and the scanner is close to the target, the user need not look away from both the target and scanning device to get the progress report. The progress report thereby facilitates surface capture of an arbitrary object by guiding the user to areas of the target not yet successfully captured. As used herein "local to" broadly means integrated into or tightly coupled with the noun modified. Conversely, "remote from" means at a distance from the noun modified. For example, both a server across a distributed network and a host PC would be regarded as remote from the unit shown in FIG. 1 while the display 105 is local to the ISA (not shown) whether disposed within main housing 115 or housing 111.

In one embodiment, the scanner may provide other types of feedback to guide the user in capturing a target. For example, the scanner may emit an audible tone either when the capture end is in range or out of range to perform a capture. Alternatively, the scanner may, for example, project a pattern (e.g., two dots) on the surface of the target that converges to a known state (e.g., a single dot) when the scanner is in capture range. In some embodiments, such other forms of feedback may be provided in addition to the visualization mechanism on the display discussed above. Notably, both of these mechanisms permit a user to view the target while receiving the feedback. In one embodiment, feedback may be provided when a portion of a target object has been imaged. Feedback for imaging may include an audible tone, indicator light, tactile feedback or similar feedback.

Main housing 115 may also include a set of manual input controls 107 to allow a user to provide input to control the scanning device. In one embodiment, the ISA may be disposed within the main housing 115 but still with optical communication to the lens 101.

Main housing 115 may also include a light source 113. Light source 113 may be a light emitting diode or similar device. In another embodiment, the scanning device may provide multiple light sources. In a further embodiment, the light source may be positioned within the housing 111. In an additional embodiment, the light source may be disposed on the housing 111. In a further embodiment, light source 113 may be moveable or rotatable to provide light from a different angle or position. Movement and positioning of light source 113 may be servo, motor controlled, or similarly controlled. Movement may be directed by a program or by the user of the scanning device. Other embodiments may not include a light source, relying on ambient lighting to capture images.

In one embodiment, main housing 115 may include a wireless communication device 109. Wireless communication device 109 may be a radio frequency (RF) transmitter, cellular device, IEEE 802.11 device or similar transmitter. In one embodiment, the wireless communication device supports the Bluetooth standard, TCP/IP communication and similar communication standards. In another embodiment, the scanning device may include a wire connector for communication with other devices. Wire communication may utilize any wire type communication protocol or technology such as a Universal Serial Bus (USB), firewire, 100 BaseT or similar communication technology.

Figure 2B:
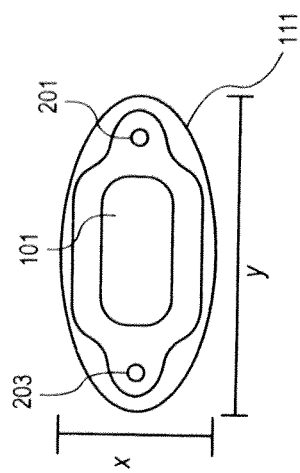
FIG. 2B is a diagram of one embodiment of a lens housing.
Figure 2A:
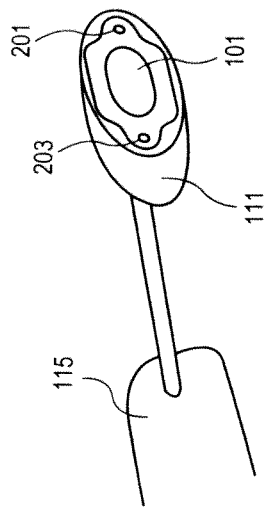
FIG. 2A is a diagram of one embodiment of a lens housing.

FIG. 2A is a diagram of one embodiment of a lens housing. In one embodiment, lens housing 111 may have light sources 201, 203 embedded within or attached to the end of the housing aligned roughly in parallel with the direction of the ISA. Lens housing 111 may have a single light source or multiple light sources 201, 203. Light sources attached to lens housing 111 allow a user to insert lens housing 111 into small apertures and interiors of objects to obtain images of the interior surfaces or surfaces not easily obtainable from an exterior position. The small size of the lens housing 111 also allow the terminus to get closer to a target, whereas large devices require a greater stand off distance to function. Imaging from a position close to the surface of the object permits less expensive optical components to be used. In one embodiment, the terminus of the image capture device requires a stand off distance of less than 6".

Light sources 201, 203 attached in lens housing 111 provide light for imaging that may not be easily obstructed or occluded by surfaces of the object to be imaged. In contrast, light sources that may be attached to main housing 115 or originate external to the scanning device may be obstructed or occluded by the surface of the target object when the lens housing 111 is imaging an interior space or under similar circumstances. Multiple light sources 201, 203 instead of a single light source may be used in some embodiments to determine the three dimensional surface of an imaged area of an object. In another embodiment, light sources may be attached in any position to lens housing 111. Light sources 201, 203 may be attached to actuators or similar devices to adjust the position and direction of the light.

FIG. 2B is a diagram of one embodiment of a lens housing from a front elevational perspective. In one embodiment, the cross dimensions x and y may be small to allow the whole of lens housing 111 to enter small apertures. The small dimensions of lens housing 111 allow the scanning device to image surfaces that are not easily accessible or visible from a position exterior to an object. An object that is within a confined space may also be imaged using a lens housing with small dimensions. The cross dimensions x, y may both be less than two inches in length. Where both of the cross dimensions of lens housing 111 are less than 2" and the light source 201, 203 are attached to or within the lens housing 111, all light supplied by the instrument and all light received for three dimensional imaging necessarily pass through a terminus of the instrument with a maximum separation of less than two inches. Two inch maximum cross dimension for the probing end has been found suitable for most capture applications. However, smaller maximum cross dimension such as 1", ½" or smaller are contemplated.

In another embodiment, either dimension x or y may have a cross dimension less than two inches in length. This may allow lens housing 111 to enter most apertures, gaps and similar passages having a two inch or greater clearance. Lens housing 111 may contain light sources 201, 203, lens 101, ISAs and similar components. Lens housing 111 may be attached to an extendible portion of a scanning device having a cross section size smaller than lens housing 111 to facilitate deployment of lens housing 111 into small spaces.

Figure 3:
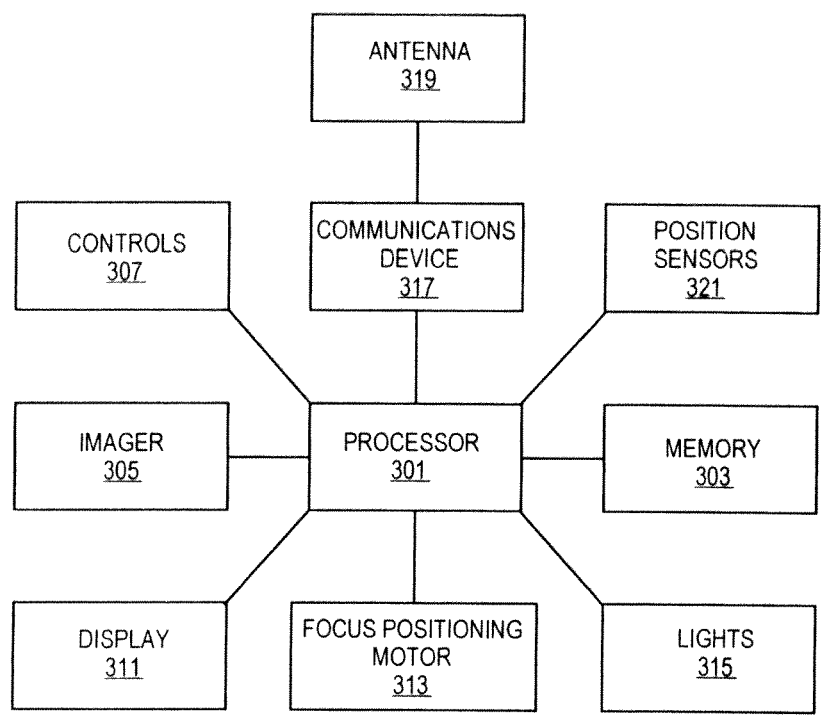
FIG. 3 is a diagram of one embodiment of the components of a scanning device.

FIG. 3 is a block diagram of one embodiment of a portable scanner device. The scanner may include a processor 301. Processor 301 may be a general purpose processor or a specialized processor. In one embodiment, processor 301 may be an application specific integrated circuit (ASIC) or similar type of processor. In another embodiment, processor 301 may be a general purpose processor.

In one embodiment, the scanner includes memory 303 for storing data and software for operating the scanner. Memory 303 may include multiple types of storage. Memory 303 may include SRAM, EPROM, FLASH, DRAM, a hard disk and similar types of memory devices. In one embodiment, memory device 303 may be removable. For example, memory 303 may be a memory stick or similar device. In another embodiment, memory 303 may be a combination of multiple memory devices. For example, memory 303 may be a combination of a hard disk and DRAM.

In one embodiment, memory 303 may store software to operate the scanning device. Software may include drivers for motors, actuators, or similar devices to control the positioning of the lenses, light sources, use of position determining devices and similar applications. Software may also be used to generate a display of incoming data or similar user feedback. In one embodiment, software may be used to communicate data to other devices.

In one embodiment, processor 301 may be in communication with imaging device 305. Processor 301 may retrieve or receive data from imaging device 305. Processor 301 may process incoming data from imaging device 305 and utilize memory 303 as a working memory and storage space for incoming images. In one embodiment, processor 301 may store images and data in a standardized, or specialized format such as jpg, tiff, gif, and similar formats. In another embodiment, processor 301 may be assisted in generating a display by a specialized graphics processor.

In one embodiment, processor 301 may execute a set of drivers or similar programs to operate a set of motors 313, servos, piezo actuators, or similar devices to adjust the position of the lenses and to adjust the focus of the lenses and imager 305. A software driver and motor may also be present in the device to adjust the telescoping of the lenses or other portions of the device. In one embodiment, imager 305 includes a CCD, CMOS or similar ISA. In one embodiment, imager 305 may include a set of sensing devices organized into an array. In another embodiment, imaging device 305 may include a matrix of image sensors positioned at different depths to receive light at different focal lengths. In such an embodiment, multiple images with different focus may be captured at the varying depths in a single capture phase.

In one embodiment, the device may include a set of lights 315. Lights 315 may be light emitting diodes, incandescent lights or similar light sources. Processor 301 may alter the state of lights 315 by executing a driver or similar program to adjust power to the lights 315. Lights may function to illuminate an object to be imaged. In one embodiment, multiple lights may be present with a fixed spatial relationship to one another. In another embodiment, lights 315 may be used to produce a strobe effect or similar lighting effect.

In one embodiment, the system may include position detection devices 321 or position sensing devices. Position tracking or detection sensor 321 may be a single device or combination of devices. The devices may include a gyroscope, global position device, altimeter or similar device that detects the orientation and position of the device in three dimensional space. In one embodiment, a set of gyroscopes and accelerometers may be used for each of an x, y and z axis. The position detection or tracking device may generate positions or movement output data that indicate the position or movement of the device that may be used by software executing on processor 301 or a remote computing device to generate the three dimensional representation of a target.

In one embodiment, the device may include a communications device 317. The communication device may transmit data to and receive data from external computing or communication devices. In one embodiment, communications device 317, may be a wireless communication device or similar device. Communication device 317 may utilize Ethernet, IP, IPX, IEEE 802.11 and similar communication protocols and technologies. In one embodiment, communication device 317 may be directly connected to an external system such as a personal computer, workstation, server or similar system. In another embodiment, wireless communication may utilize Bluetooth, cellular, IEEE 802.11 or similar communication protocols or technology. Communication device 317 may be connected to an antenna 319 or similar device to transmit and receive wireless signals. In one embodiment, the communication device 317 may communicate with a network interface to send data to a remote system on a distributed network such as a local area network (LAN) or the Internet. In another embodiment, communication device 317 may communicate via a wire line using a technology such as a universal serial bus, firewire, 100 BaseT or similar communication medium or protocol.

In one embodiment, the device may include a set of controls 307 or input devices. Controls 307 may be a set of buttons, a touchpad, or similar input devices. Input from control device 307 may be handled by a driver or similar software that is executed by processor 301 to manipulate the settings and actions of the capture device.

Figure 4:
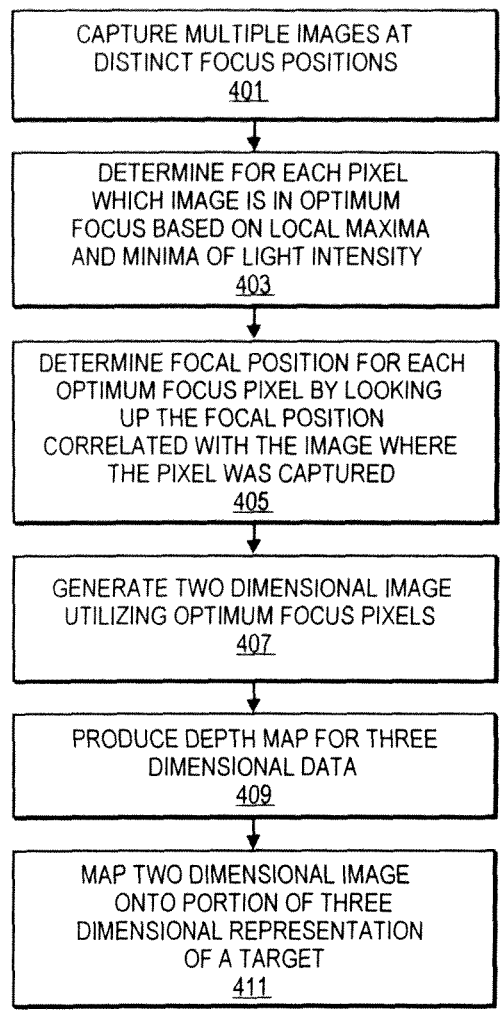
FIG. 4 is a flowchart of one embodiment of a process for generating a three and two dimensional mapping of an object.

FIG. 4 is a flowchart of one embodiment of a process for generating three and two dimensional mappings of an object. In one embodiment, the mapping process may be initiated by capturing a set of images of the object to be mapped (block 401). In one embodiment, any number of images greater than one may be taken of the target. Plural images taken at different focal settings of a same portion of the target may be used to derive a full focus composite image and/or depth measurements for that portion of the target as described below. In one embodiment, the images at differing focal settings may be obtained by altering the position of a lens or set of lenses relative to the ISA. Alternatively, the images may be obtained by utilizing multiple lenses or ISAs to capture multiple images of varying focal depths. In one embodiment, the multiple images may be captured simultaneously or in a short period of time. This should minimize or eliminate the effects of motion on the capture device whenever images are captured at different depths. The set of images may include the same area of a target at varying focal settings. In one embodiment, each captured image has a small depth of focus. Depth of focus may be a range in which an image or pixel is in satisfactory visual focus. Thus, only pixels corresponding to points on the target within the range will be in focus in a particular image. The images may be captured with a resolution of finer than 300 pixels per inch so that optimum focus for a surface of a target can be determined even when the surface appears substantially homogenous to an unaided human eye.

In one embodiment, the device may analyze pixels of a set of images captured to determine which of the pixels in a set of corresponding pixels (e.g., corresponding to a same point on or area of a target) is in optimum focus (block 403). Corresponding pixels may be determined based on the position of the pixel in an imaging array, by the color or encoding of a captured pixel, by correlation of pixels based on positioning sensor data or by similar methods. For example, the device may capture three complete images simultaneously in three separate ISAs, set of lenses or a combination thereof. The imaging devices may have matching array sizes. The pixels at the same position may be compared to determine which pixel is in optimum focus based on determining local minima and maxima of light intensity or brightness. Light intensity may be measured at the level of a pixel. Any encoding may be used and the encoding compared to determine the pixel with most or least light intensity. In one embodiment, the pixel with optimum focus may be found by selecting the most or least light intense pixel. In one embodiment, this selection is made by analysis of neighboring pixels. In another embodiment, the most and least light intense pixel may be processed with a mathematical function, a calibration table, or a similar process or combination of processes to determine which pixel is in optimal focus. In a further embodiment, the most light intense pixel may be selected for optimum focus.

In one embodiment, the processing to discern the local maxima and local minima and the determination of which pixels are in optimum focus may be performed local to the capture device. In another embodiment, all the captured data may be offloaded to a host processor for further processing to discern which pixels are optimally focused.

In one embodiment, the focal position may be determined that corresponds to each optimum focus pixel (block 405). As used herein an optimum focused pixel may be the pixel having the best focus of the pixels captured corresponding to the same point or area on the target. The focal position may be measured in terms of device positioning detected by positioning sensors, by calculation of focal lengths based on the position of the lenses and imaging device or similar methods. The focal position of each captured pixel may be recorded when each image is captured. When each optimum focus pixel is determined, the focal position of the pixel may be correlated with the pixel by determining the image in which it was captured. The focal settings of each image may be stored when captured and used to determine a focal position for the individual pixel.

In one embodiment, the optimally focused pixels may be compiled into a composite two dimensional image (block 407). By selecting the optimally focused pixels to assemble into a composite image, the composite image generated has substantially optimum focus. The composite image may be stored in any format. Formats may include jpg, gif, tiff, or similar formats. The composite image may be stored locally in the device or may be transmitted to an external storage device or system. The composite image may be stored and used as the visual representation of the imaged region of the target being scanned. The composite image may be used as a texture map or bitmap to be mapped onto a three dimensional representation of the target being scanned.

In one embodiment, a depth map may be produced from the spatial data associated with the pixels of the composite image (block 409). The focal position data associated with each pixel of the composite image may be utilized to determine the distance from the imager to the point/area of the target corresponding to the pixel. The compilation of these distances associated with the composite image may be used to produce as a component depth map. Since only the pixels of the composite image need to be processed to find the depth map, which represents a much smaller data set than the total pixels captured, processing overhead to generate a three dimensional representation is reduced. The composite depth map may be meshed to create a three dimensional model of a surface of the target. This model may ultimately be combined with other three dimensional representations to form a larger representation of the target. In some embodiments, a point cloud is generated as a three dimensional representation of the target rather than the depth map.

In one embodiment, the two dimensional composite image can be mapped onto the three dimensional representation as a texture map or by a similar method (block 411). The three dimensional representation and texture map may be stored in a combined format or in separate files or formats or similar configurations.

In one embodiment, this process may be repeated to generate multiple three dimensional representation and texture maps. These representations and texture maps may overlap one another. They may be stored as separate files, objects or similar data structures. In one embodiment, newly generated representations and texture maps may be continuously pieced together with prior representations or maps to form a smaller set of representations and maps or a single three dimensional representation and texture map. Stated differently, the discrete patches modeled may be aligned to form more or all of a model of the target being scanned. In one embodiment, forming the composite data sets including the composite image and the composite depth map may be done using a processor local to the imaging device. In another embodiment, this processing may be performed at a host processor remote from the image capture device.

Figure 5:
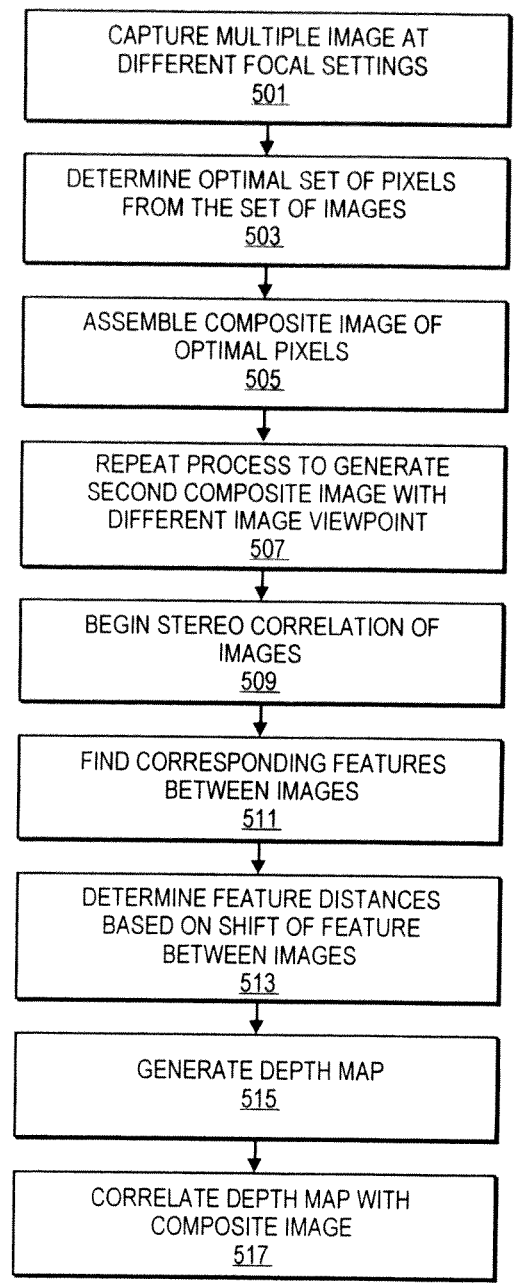
FIG. 5 is a flowchart of one embodiment of a process for generating a three dimensional model using stereoscopy.

FIG. 5 is a flowchart of one embodiment of a process for generating a three dimensional representation of a target using stereoscopy. In one embodiment, a device may be activated by a user to initiate a scan of a target or portion of a target. The process may capture an image or set of images at a first focus position (block 501). The set of images may be captured by a single ISA or a set of ISAs. The multiple images may be obtained by moving the relative positions of lenses and ISAs or by moving one or more reflectors positioned in the optical path between the lenses and the ISAs. In another embodiment, the device may have multiple ISAs at different focal positions. In one embodiment, individual images may be captured with a resolution of greater than 300 pixels per square inch to allow optimum focus to be determined for substantially homogenous surfaces.

In one embodiment, a composite image of optimally focused pixels may be compiled (block 503). The optimally focused pixels may be determined by detecting local minima and maxima in each set of related pixels (block 505). Multiple optimally focused pixels representing different points on the target may be compiled into a single composite image (block 505). This image may be stored in an uncompressed or compressed format such as a jpeg, tiff, gif, bitmap or similar format.

In one embodiment, the process of generating a composite image is repeated with the ISA or ISAs capturing an image of the target at a different angle, position or point of view from the first composite image (block 507). The second composite image may be generated using the same set of imaging devices by the user moving the imaging devices or by an automated process of moving the imaging devices. For example, a reflector may be adjusted to alter the focal length between the target and the ISAs. In another embodiment, the second composite image may be generated approximately simultaneously with the first composite image by use of a second set of ISAs offset from the first set.

In one embodiment, the first and second composite images may be analyzed to correlate the images (block 509). The images may be correlated by detecting the same features in both images (block 511). Common features may be detected by detecting patterns present in both images. These patterns may be patterns of encoded pixels, groups of pixels or approximations thereof. Any algorithm for common feature detection may be utilized. In various embodiments, the correlation may occur local to the image capture device, while in other embodiments, the correlation may occur remote to the image capture device. In another embodiment, the process may be employed with multiple images. The above description discusses the use of two images as an example.

In one embodiment, after the common features between two composite images have been determined, the distance from the imager to the features may be determined (block 513). The distance to each feature may be calculated by measuring the shift of the feature between the two composite images. Each of the distances to the identified features in the composite images may be stored and compiled to generate a depth map of the imaged region of the imaged target (block 515). In one embodiment, any of the images utilized to generate the depth map for the imaged region may be correlated to the depth map and used as a texture map of the region (block 417). The texture map and depth map may be accumulated with other texture maps and depth maps to generate a three dimensional representation of a target and a texture map for the three dimensional representation.

Figure 6:
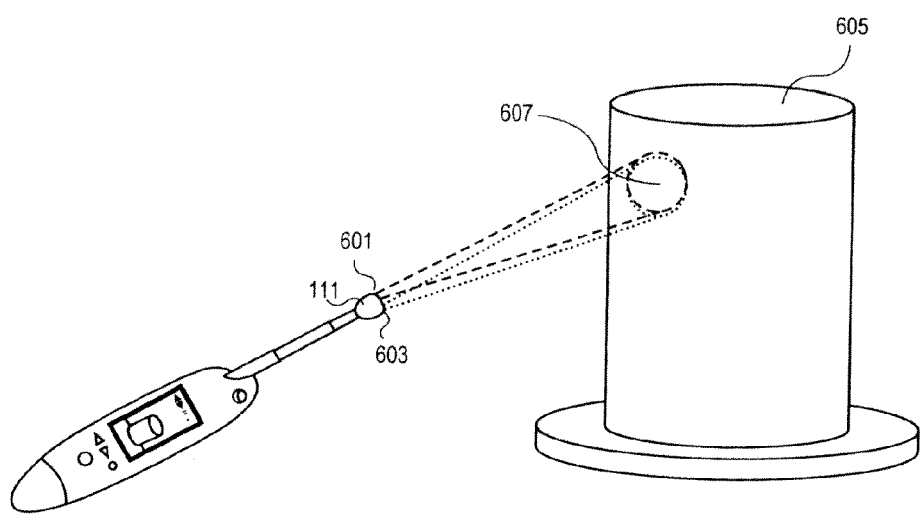
FIG. 6 is a diagram of one example embodiment of a scanning device imaging an object using stereoscopy.

FIG. 6 is a diagram of a scanning device imaging a target using stereoscopy. In one embodiment, the scanning device may have multiple ISAs contained in lens housing 111. In another embodiment, the scanning device may have a moveable or adjustable lens focusing system. For example, lens housing 111 may contain a 'left' ISA 601 and a 'right' ISA 603. Multiple ISAs may have any relative position to one another. The multiple ISAs or adjustable focus ISA may image an area of an object 605 from two positions offset from one another and at a different angle from imaged area 607. For example, left side ISA 601 and right side ISA 603 may image region 607 of target 605. ISA 601 and 603 may have a known distance from each other and a known relative angle with respect to a target at varying distances. These images may be compared to determine the distance to each pixel associated with imaged region 607 by aligning pixels from each image and determining the change between images for identical features. These distances may be used to generate a three dimensional representation of region 607.

Figure 7:
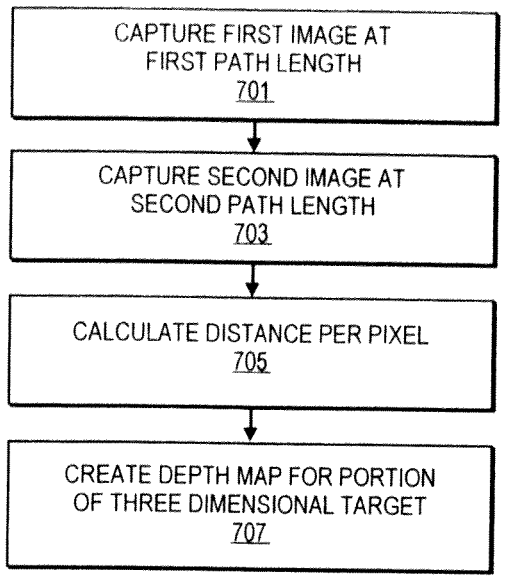
FIG. 7 is a flowchart for one embodiment of a process for scanning an object by calculating radiant light fall off.

FIG. 7 is a flowchart of an embodiment of a process for scanning a target by calculating the radiant fall off of a light source on a target. In one embodiment, a first image of a target or portion of a target is obtained by an imaging device (block 701). The first image may be captured using a first optical path length or distance from the target. "Optical path length" as used herein refers to the distance illumination travels from an emitter to the target and back to a detector. In one embodiment, the emitter may be a LED and the detector an ISA. A second image of the same target or region of the target may be captured subsequently or simultaneously (block 703) at a different optical path length. In one embodiment, multiple ISAs and/or lenses may be used to capture images having different optical path lengths. In another embodiment, the position of the imager, lens, or scanning device may be altered to obtain the second image at a different path length. In a further embodiment, a light source angle or distance may be varied and an image with a known light source distance change from the first image used. An illumination source may be pulsed at high frequency to distinguish it from ambient light.

In one embodiment, the first image is compared with the second image on a pixel by pixel basis. Pixels capturing light from the same surface areas are correlated. The pixels may be correlated by matching features, tracking device position or by similar methods. A calculation may be made to determine the radiant fall off or differences in brightness or luminescence between the correlated pixels. In one embodiment, the difference in path length is known because it is a function of the components within the capture device. Based on the known relation the distance to the corresponding points on the target can be calculated (block 705).

In one embodiment, the distance may be calculated by evaluating the radiant falloff of light over distance. For example, if
L=light measured by the ISA,
d=the total path length from the source to a Lambertian surface to the ISA
c is a known constant encompassing the brightness of the source, the color of the surface, etc.
then $$L = \frac{c^2}{d^2}$$

If consecutive images are captured where the path length may be changed by a known amount ($\Delta d$) between the captures, then:

$$L_1 = \frac{c}{d^2}$$

$$L_2 = \frac{c}{(d + \Delta d)^2}$$

The ratio of the measured light intensities:

$$\frac{L_1}{L_2} = \frac{(d+\Delta d)^2}{d^2}$$

This equation may be reduced to solve for distance d:

$$d = \Delta d \left( \frac{-1 \pm \sqrt{1-(L_2-L_1)}}{L_2-L_1} \right)$$

Either the positive or negative root may be valid depending on whether the path length change (Δd) is negative or positive respectively.

In another embodiment, calculations may be eliminated by building a lookup table of distance vs. intensity ratio at calibration time. This considerably decreases the required processing time, and compensates for non-idealities of the system.

In one embodiment, the distances to each surface point corresponding to each pixel may be used to generate a depth map of the surface of the target or region of the target (block 707). This depth map may be matched with a texture map based on an image of the surface of the target. The texture map and depth maps may be accumulated to generate a three dimensional representation of a target, which may include a texture map of the surface texture of the target.

Figure 8:
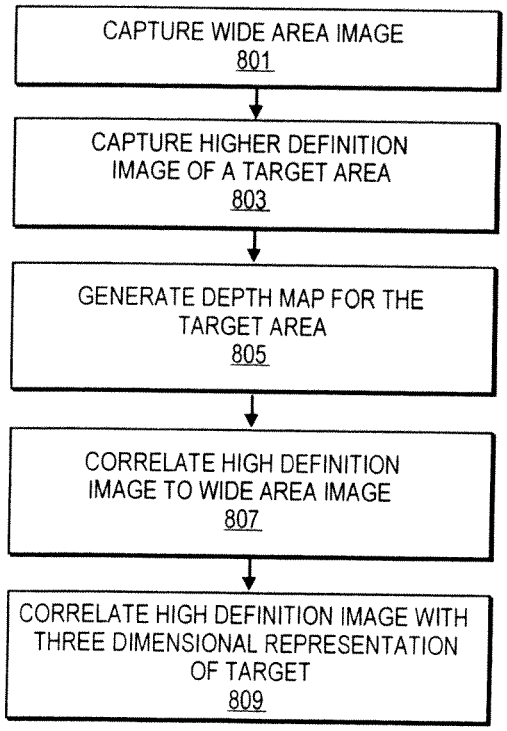
FIG. 8 is a flowchart for one embodiment of a process for aligning data in a scanning process.

FIG. 8 is a flowchart of one embodiment of a process for aligning data in a scanning process. In one embodiment, a scanning device may capture a wide area image of a target object that is being scanned (block 801). This wide area image may be utilized to coordinate the piecing together of higher quality images and models of portions of a target being scanned. A higher definition or quality image may be captured of a smaller area of a target (block 803). A depth map may be generated of the smaller area of the target using any of the methods described in the various embodiments (block 805). The depth map may be generated and correlated to a texture map for the small area imaged at the higher definition.

In one embodiment, the small area image may be matched to a region of the wide area image (block 807). The small area image may be matched to a portion of the wide area image by feature or pattern matching or similar methods. The related depth map and texture map derived from the small area image may thereby be related to other small area image depth maps and texture maps (block 809). Depth maps and texture maps with adjoining or overlapping surface areas may be combined in a three dimensional representation or a portion of a three dimensional representation. In another embodiment, depth maps and texture maps from non-contiguous areas of a scanned target may be compiled into a single representation or texture map with gaps or space for regions not yet scanned or generated.

In another embodiment, the wide area image may be taken at any level of definition. Smaller area images may be taken at any level of definition relative to the wide area image consistent with this alignment process. For efficient processing and memory or storage usage, a low definition wide area image may be used. In a further embodiment, a single high definition wide area image may be taken and subdivided into smaller images for efficient processing in multiprocessor environments or under similar conditions.

This process may continue by taking additional wide area images to coordinate the assembly of depth maps and texture maps. This process may continue until the entire three dimensional representation of the target is generated or the scan is halted by a user or automatically such as under software control.

Figure 9:
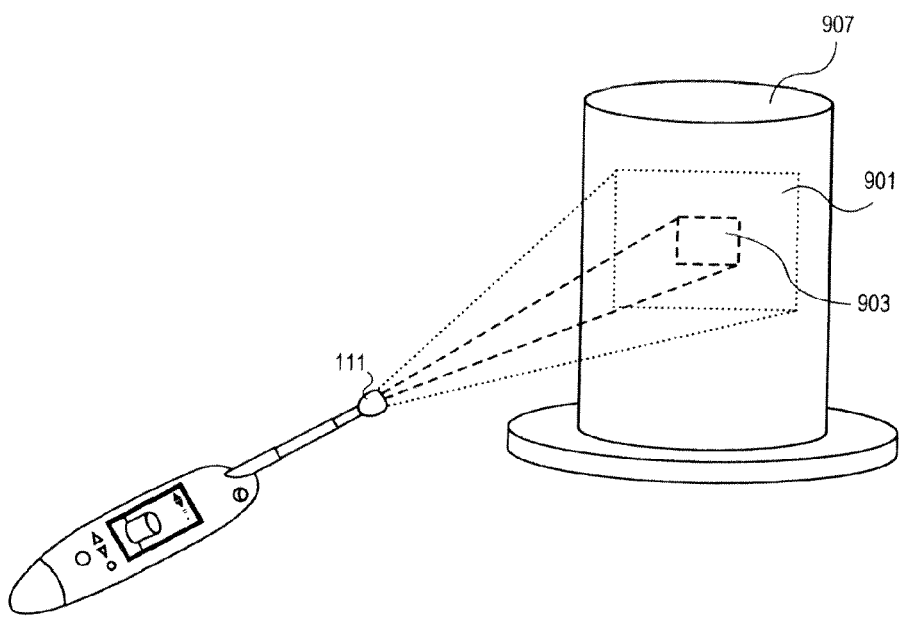
FIG. 9 is one embodiment of a scanning using a wide area image to correlate small area images into a three dimensional representation.

FIG. 9 is a diagram of one example embodiment of a wide area image used to determine the position of a small area image in relation to the whole of the target being scanned. In one embodiment, the scanning device may utilize a wide area image to determine the relative position of smaller area images that may be processed to generate a three dimensional representation of a portion of a target. In one embodiment, the scanning device may have an ISA or multiple ISAs that are capable of capturing a wide area image and a small area image. In another embodiment, an ISA may have a higher sensor density in a central region of the ISA to capture a higher definition small area image in the middle portion of a wide area image. For example, lens housing 111 may contain an ISA with a dense central collection of sensors. The ISA may be capable of capturing a wide area image 901 of target 907. The ISA may also be capable of capturing a higher definition small area image 903 of target 907. Small area image 903 may be used to generate a three dimensional representation of the small area 903 of target 907. Wide area image 901 may be used to align the three dimensional representation of small area 903 with other small area representations of target 907 by correlating other small area representations with the features in wide area image 901. In another embodiment, a nonlinear lens or similar light focusing mechanism may be used with an ISA to focus a smaller area of the target onto a larger area of the ISA. This system may be used to capture a large area image of a target area including a higher definition section for a portion of the target area.

Figure 10:
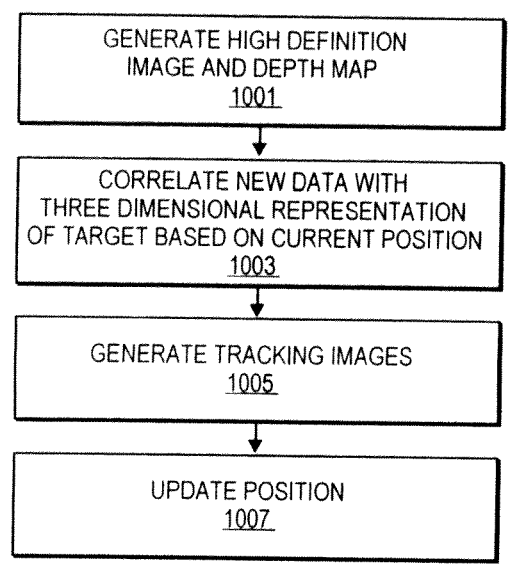
FIG. 10 is a flowchart of one embodiment of a process for aligning imaging data to generate a three dimensional model by tracking the position of the scanning device.

FIG. 10 is a flowchart of one embodiment of a process for aligning imaging data to generate a three dimensional representation by tracking the position of the scanning device. In one embodiment, the scanning device captures an initial high definition image and generates a depth map from the image using any technique to extrapolate the depth map from the high definition image, a set of high definition images, a composite image or similar data (block 1001). The depth map may also be matched with a texture map that may be based on the high definition image. In another embodiment, any level of definition may be used in generating the depth map and texture map dependent on the level of quality in detail of the model of the object desired by the user.

In one embodiment, the depth map may be correlated to a three dimensional representation based on a known position, relative position or similar positional information (block 1003). The depth map may be the first data added to the representation and may serve as a base reference point for subsequent data added to the representation. The positional data may be correlated with the depth map based on position tracking devices in the scanner or in communication with the scanner or the computing device compiling the three dimensional model. A texture map may also be accumulated by piecing together the texture maps associated with each depth map to form a single texture map for the three dimensional representation. In another embodiment, multiple texture maps are associated with the three dimensional representation.

In one embodiment, the scanning device or imaging devices may be moved subsequent to the capturing of the image. The calculation of the depth map, texture map and three dimensional representation may be accomplished subsequent to or during a scan of the target. Positional data may be maintained by capturing a set of images to track the movement of the scanner relative to its previous position (block 1005). The movement may be calculated by comparing the intermediary images to match features to determine direction and speed of movement. The images used to track movement may be low definition or low quality images. In one embodiment, these images may be deleted or discarded after the determination of the position or movement rate of the scanning device. In another embodiment, the images may be retained for use in developing the three dimensional model and texture map.

In one embodiment, the tracking information may be used to update the position of the scanning device (block 1007). The position may be used by the various embodiments of three dimensional representation and texture map generation. This position tracking process may be a continually repeating program or procedure to maintain current position information at all times.

Figure 11:
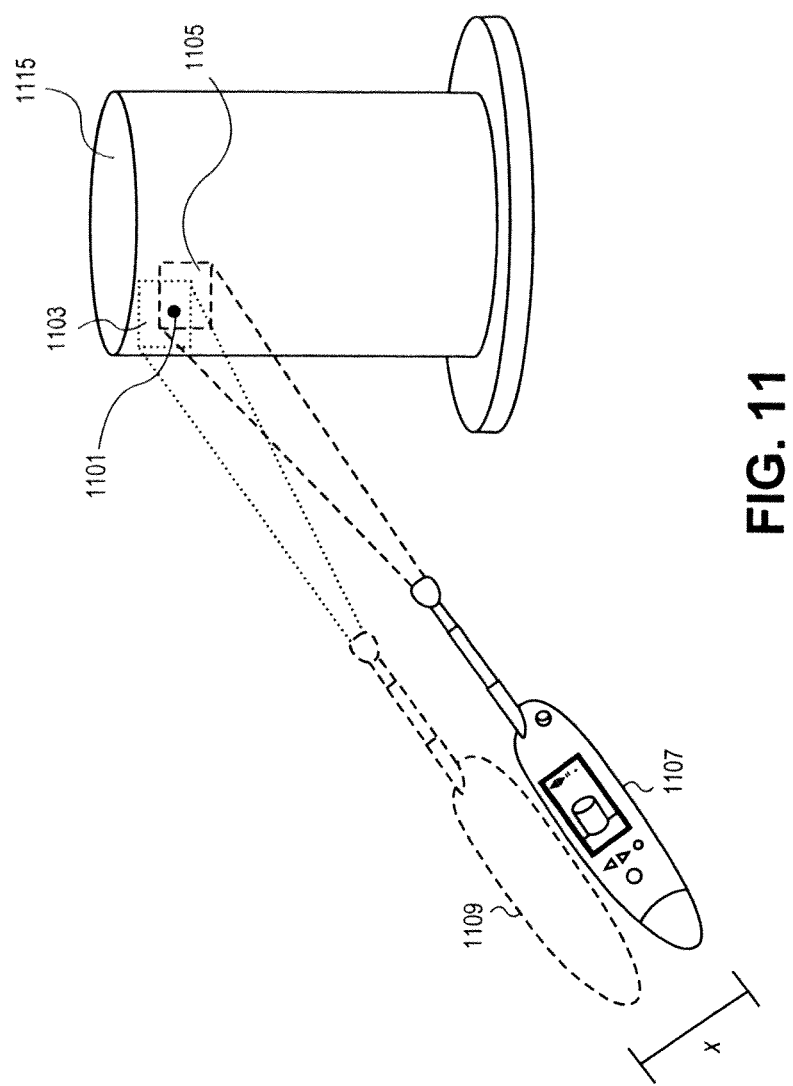
FIG. 11 is one embodiment of a scanning device tracking its position utilizing image motion tracking.

FIG. 11 is a diagram of one example embodiment of a motion tracking system for a scanning device. In one embodiment, the scanning device may capture images of the surface of a target at a high frequency to determine changes in position of the scanning device. The high frequency capture of images may utilize a low resolution or low quality image capture, while image capture for use in generating three dimensional representations or texture maps may utilize a higher definition image capture. The scanning device may have a single ISA or multiple ISAs to capture the high frequency images for motion tracking.

In one embodiment, motion tracking is based on the detection of features of a target being imaged by the scanning device. For example, target 1115 may have a black dot 1101 on its surface that may be tracked as a feature of target 1115. The scanning device starting in position 1109 may capture an image of area 1103 containing feature 1101. The scanning device may be moved to a new position 1107. The scanning device captures another image 1105 that contains feature 1101. The distance x that the scanning device has been moved and the position of the scanning device in three dimensional space may be determined by analyzing the movement of common features between motion capture images 1103 and 1105. The movement of feature 1101 between image 1103 and 1105 may be measured and used to calculate the distance x moved by scanning device as well as any other movement of the scanning device in three dimensional space. In addition, the change of positions between images of features may be combined with image capture frequency rate to determine the speed and acceleration of the scanning device. This information may be utilized to maintain current position information for the scanning device for use in generating depth maps and similar three dimensional representations of a target.

In one embodiment, images may be captured at a resolution greater than or equal to 300 pixels per inch as measured at the target surface. This resolution level may assist in capturing features that may be used for position calculations. In one embodiment, features may be captured that are not visible to the unaided human eye.

Figure 12A:
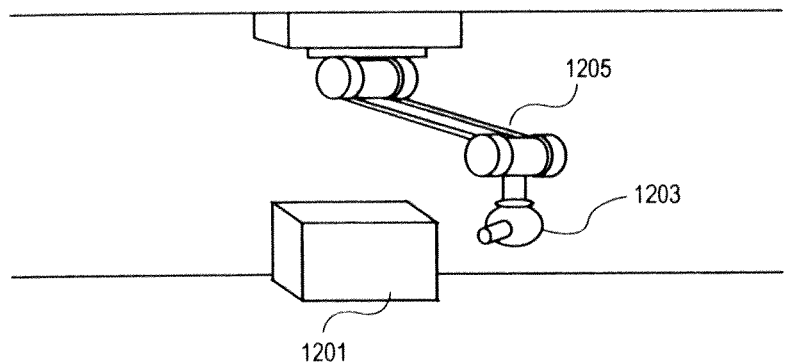
FIG. 12A is a diagram of one embodiment of a robotic arm system for scanning objects.

FIG. 12A is a diagram of one embodiment of a robotic arm system for scanning objects. In one embodiment, capture device 1203 may be attached to a robotic arm 1205 or similar powered positioning systems. Capture device 1203 may have been packaged in various functional form factors to accommodate robotic arm 1205 coupling sizes and intended target 1201 sizes. In one embodiment, capture device 1203 is able to capture three dimensional range data about a target. Robotic arm 1205 may include a set of joints, pivot points, actuators, motors, servos, and similar components to allow robotic arm 1205 to rotate around object 1201 and position scanning device 1203 at any angle needed to scan all surfaces of object 1201. In one embodiment, scanning device 1203 may include a telescoping head to allow the scanning device to capture images of interior spaces in object 1201.

In one embodiment, robotic arm 1205 and scanning device 1203 may be in communication with an external computing device to receive positioning and imaging commands to guide the scanning of object 1201. The external computing device may collect data gathered by scanning device 1203 and robotic arm 1205 to generate the three dimensional representation and texture map. Robotic arm 1205 may be guided by user input or by an application, driver or similar program.

Figure 12B:
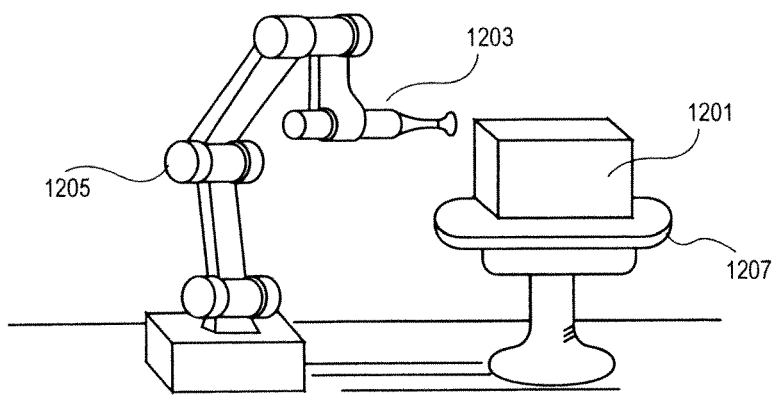
FIG. 12B is a diagram of one embodiment of the robotic arm system with a turntable.

FIG. 12B is a diagram of another embodiment of the robotic arm system. In one embodiment, robotic arm 1205 and scanning device 1203 may have a limited range of movement relative to target 1201 to be scanned. A turntable 1207 may be utilized to facilitate the scanning of target 1201. Turntable 1207 may be composed of a flat surface, motors, actuators, servos, and similar components. Turntable 1207 may be in communication with robotic arm 1205 or a computing device to receive commands to guide the movement of turntable 1207. In one embodiment, a computing device generates signals and similar commands to guide the movement and actions of robotic arm 1205, scanning device 1203 and turntable 1207 to scan object 1201 and generate a three dimensional representation and texture map of object 1201. Turntable 1207 may be used to rotate object 1201 past scanning device 1203. Scanning device 1203 may alter its height or angle as target 1201 rotates to get a complete scan of the exterior of the target. Interior surfaces may be scanned by rotating an exterior opening of target 1201 into a position that allows scanning device 1203 and any telescoping or extensible aspects of the device to be extended into the interior of target 1201. Turntable 1207 may be used in combination with other powered positioning systems in accordance with the concept described in relation to the robotic arm system.

Figure 13:
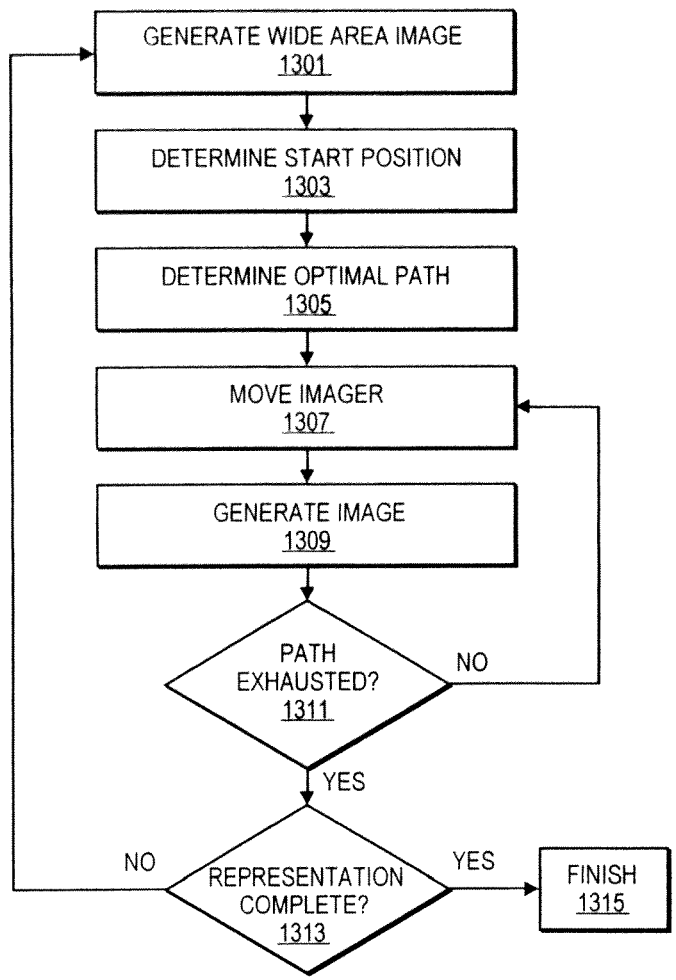
FIG. 13 is a flowchart of one embodiment of a process for scanning an object utilizing a robotic arm system.

FIG. 13 is a flowchart of an embodiment of a process for scanning an object utilizing a robotic arm system. The process may be implemented as a program to be executed by a computer in communication with the robotic arm system or by a controller coupled to the robotic arm system. In one embodiment, after an object has been put in place for scanning the robotic arm may be moved to an initial position with the scanning device positioned to capture an image of the object. The scanning device may be utilized to generate a wide area image of the target (block 1301). The wide area image may be analyzed to determine a general outline, size, shape and similar properties of the object. An initial starting point may be determined based on the basic shape or similar properties of the target (block 1303). An optimal path may also be generated to plot a course of movement for the arm to facilitate the scanning of the target (block 1305).

An optimal path may be a path that allows the robotic arm and scanning device to make the fewest movements, travel the shortest distance or capture the fewest images to complete the scan. Any path finding algorithm may be utilized. An optimal path including a starting position may be a set of locations for capturing images of the target. The optimal path may also include the operation of a turntable that rotates the target in front of the scanning device. For example, some targets may be imaged by moving the scanning device up or down while the target is rotated.

In one embodiment, after a path and starting point have been determined the robotic arm may be instructed to move to the first position in the path or to the starting point (block 1307). Once in position the scanning device may be activated to capture an image of the target or set of images of the target (block 1309). In one embodiment, the image may be a set of high definition images used to generate a depth map and a portion of the three dimensional target and texture map. Any technique may be used to transform the set of images into three dimensional representation and texture map data. At each position a set of image texture maps and a three dimensional representation may be generated. The representation and texture maps may be assembled into a three dimensional representation and texture map of the whole target using the known positions and angle of the robotic arm of the time the image was captured. In one embodiment, an alignment process or calibration process may be used to correct for any errors in the known position of the robotic arm.

In one embodiment, the program may then check the path data to determine if further points in the path remain (block 1311). If the path has not been exhausted then the robotic arm may be instructed to move to the next position (block 1307) and the next set of images captured (block 1309). If the path has been exhausted, then a check may be made to determine if the scanning of the target and generation of the three dimensional representation has been completed (block 1313). A three dimensional representation may be completed based on user feedback, an exhaustion of scanning all exterior angles, an analysis of the shape of the target or similar methods. If the scan of the target has not completed, then the process may be restarted by taking another wide area image (block 1301) and a determination of a path for capturing additional elements of the target that were not captured in a previous path (block 1303). In another embodiment, the next path may be determined from an earlier wide area image or other data or user input. If a turntable is used in the system, then the turntable may be rotated such that a wide area image may be captured from an angle that had not been previously captured. If the three dimensional model has been completed and a complementary texture map or set of texture maps generated then the process may finish (block 1315).

In one embodiment, three dimensional representations and texture maps produced according to any of the embodiments may be created externally from the scanning device, internally to the scanning device or partially externally and internally. The scanning device may store raw data, intermediate data, or processed data. The unprocessed data may be processed into a three dimensional representation and texture map at a time convenient to a user.

The use of the embodiments allow for high definition representation of targets to be created that capture small defects and microdefects in the target. The scanning device may be used in close proximity to the target to obtain high quality images of the surface of the target that may be pieced together to form a whole model. The size of the scanning device and the extensions of the scanning device allow the scanning device to be used in close proximity to targets of all shapes and allow the scanning device to capture images of interior and hard to reach spaces of a target that may not be visible from the exterior of the target. These characteristics of the scanning device improve the quality of the three dimensional representations and texture maps that it may produce.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    capturing multiple images of a target in an image sensing array (ISA) at different focal settings;
    analyzing over a plurality of the images an intensity of light at a pixel corresponding to a point on the target; and
    identifying one of a local maxima or minima of the intensity of light for the pixel to determine which image contains a substantially optimum focus for the pixel.

2. The method of claim 1 further comprising:
    determining a distance to a point on the target by analyzing the optimum focus for the pixel.

3. The method of claim 1 wherein identifying is performed local to the ISA.

4. The method of claim 2 wherein determining is performed local to the ISA.

5. The method of claim 1 further comprising:
    identifying a substantially optimum focus image for a plurality of pixels and assembling them into a composite image of substantially optimum focus.

6. The method of claim 5 further comprising:
    determining a distance to a corresponding point on the target for each of a plurality of pixels by analyzing the optimum focus for each pixel of the plurality and assembling the distances into a composite depth map; and
    assembling the composite image data with the composite depth map to form a composite data set containing both texture and depth data.

7. The method of claim 6 wherein forming the composite data set is performed local to an image capture device.

8. The method of claim 5 further comprising:
    incorporating the composite image into a three dimensional representation of the target.

9. The method of claim 5 further comprising:
    performing stereo correlation on the composite image and a second composite image to assemble a composite depth map.

10. The method of claim 1 further comprising:
    determining a distance to a corresponding point on the target for each of a plurality of pixels by analyzing the optimum focus for each pixel of the plurality and assembling the distances into a composite depth map.

11. The method of claim 10 further comprising creating a three dimensional representation of the target using the composite depth map.

12. The method of claim 1 wherein capturing at different focal settings comprises:
    moving at least one of an image sensing array (ISA) and a lens with a piezo actuator.

13. The method of claim 1 wherein capturing at different focal settings comprises:
    selecting at least one of a plurality of distinct image sensing arrays (ISAs) and lenses at different focal distances.

14. The method of claim 1 wherein capturing at different focal settings comprises:
    using an ISA capable of concurrently focusing at different depths within its structure.

15. The method of claim 1 wherein the optimum focus can be determined for a target surface that appears substantially homogeneous unless captured at finer than 300 pixels per inch resolution as measured at the target surface.

* * * * *